(12) United States Patent
Neet et al.

(10) Patent No.: US 7,808,137 B2
(45) Date of Patent: Oct. 5, 2010

(54) SINGLE TRACK LAYER STATOR TERMINAL ASSEMBLY

(75) Inventors: Kirk Neet, Pendleton, IN (US); Scott Bitzer, Fishers, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 825 days.

(21) Appl. No.: 11/543,624

(22) Filed: Oct. 5, 2006

(65) Prior Publication Data

US 2008/0084128 A1    Apr. 10, 2008

(51) Int. Cl.
*H02K 11/00* (2006.01)
*H02K 23/66* (2006.01)
(52) U.S. Cl. .................................... 310/71; 310/68 B
(58) Field of Classification Search ............. 310/71, 310/68 B
See application file for complete search history.

(56) References Cited

U.S. PATENT DOCUMENTS

| 5,043,614 | A  | * | 8/1991 | Yockey ............... 310/68 D |
| 5,682,070 | A  | * | 10/1997 | Adachi et al. ............ 310/71 |
| 6,552,908 | B2 | * | 4/2003 | DeNardis ............... 361/709 |
| 2006/0091746 | A1 | * | 5/2006 | Takeuchi ............... 310/71 |

* cited by examiner

*Primary Examiner*—Quyen Leung
*Assistant Examiner*—Leda Pham
(74) *Attorney, Agent, or Firm*—Cantor Colburn LLP

(57) ABSTRACT

Disclosed is a terminal assembly for a stator of a dynamo-electric machine. The terminal assembly includes a at least five electrically conductive tracks arrayed in a single layer, each track configured and positioned for electrical communication with corresponding leads extending from the stator providing electrical connection between at least one lead of stator leads and a rectifier bridge. The tracks are at least partially encapsulated in a nonconductive casing.

11 Claims, 3 Drawing Sheets

SINGLE TRACK LAYER STATOR TERMINAL ASSEMBLY

BACKGROUND OF THE INVENTION

The present disclosure relates generally to dynamoelectric machines. More specifically, this disclosure relates to an apparatus for termination of conductors of a stator having six phases and concentrated leads in a vehicle alternator and method of manufacture of the apparatus.

Electric machines, such as alternating current electric generators, or alternators, are well known. Prior art alternators typically include a stator assembly and a rotor assembly disposed in an alternator housing. The stator assembly is mounted to the housing and includes a generally cylindrically shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming six phases. The stator lead wires are typically concentrated in a small area, perhaps even in consecutive slots, and are routed to and connected to a stator terminal assembly.

Stators having six phases typically have stator terminal assemblies which include six electrically conductive tracks. One end of each conductive track is connected to the stator lead wires and another end is connected to a diode pair or similar switching elements of a rectifier bridge. To successfully dissipate diode heat, it is desirable to have the twelve (six pairs of) diodes physically spread out around the alternator circumference. The resultant conductive tracks, therefore, have one end in close proximity to each other (stator lead end) and another end spread out (diode pair end). At the stator lead end, the conductive tracks often interfere with each other and it is a common practice to partially dispose one track on top of another in the axial direction. This is vernacularly called a dual layer track stator terminal assembly. This results in a terminal assembly having a thickness that can in some instances block airflow within the alternator. Such conditions can present rectifier cooling issues. In addition, a dual layer track, if there were a way to reduce that thickness would be viewed as taking up valuable space that could be used, for example, for rectifier cooling fins. Furthermore, the dual layer track stator terminal assembly requires that each track be formed individually and is otherwise difficult and costly to manufacture because of the need to stack the individual tracks. Conversely, when a plurality of conductor tracks are arranged such that the tracks are not partially disposed on top of other tracks in the axial direction, these conductor tracks are considered as being disposed in a single layer.

It is desirable, therefore, to provide a stator terminal assembly of a six phase alternator, with reduced thickness to alleviate properties of the electric machine such as rectifier cooling issues, and also to provide a stator terminal assembly of simplified manufacturability.

SUMMARY

Disclosed herein is a terminal assembly for a stator of a dynamoelectric machine. The terminal assembly includes at least five electrically conductive tracks disposed in a single layer, each track of the at least five tracks configured and positioned for providing electrical communication between a rectifier bridge and at least one lead of a plurality of leads extending from the stator, at least five of which are disposed in an arc of less than ninety degrees of the circumference of the dynamoelectric machine. The at least five tracks are at least partially encapsulated in a nonconductive casing.

The terminal assembly is manufactured by forming at least five tracks in a single layer from one piece of conductive material, each track of the at least five tracks remaining connected to adjacent tracks of the at least five tracks by a plurality of sprues. The tracks are at least partially encapsulated in a nonconductive case after which the plurality of sprues are severed, creating at least five individual tracks and thereby eliminating electrical communication between the at least five tracks.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

Figure 1:
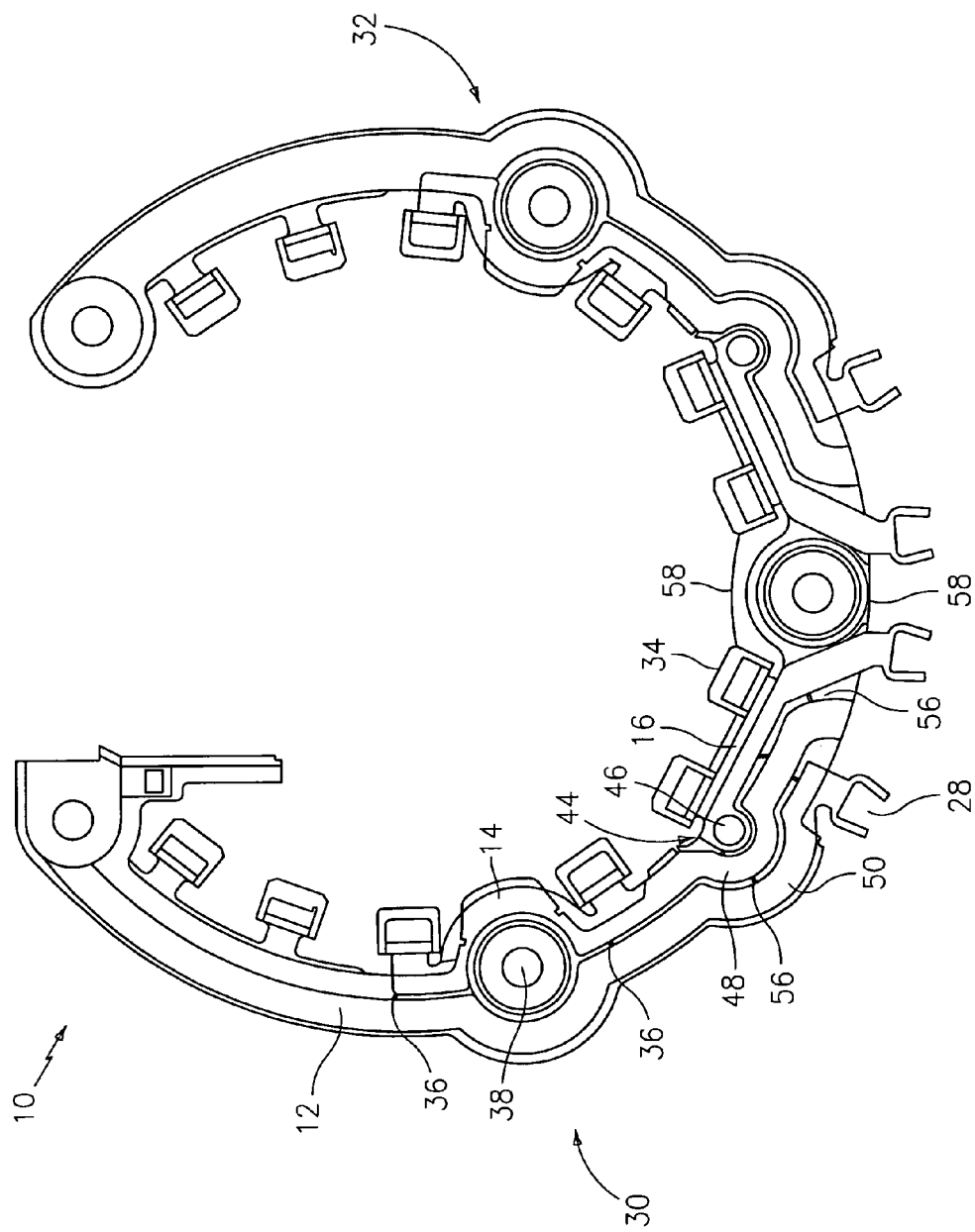
FIG. 1 is a plan view of an embodiment of a single-layer stator terminal assembly.

An embodiment of a single-layer stator terminal assembly 10 having six phases is shown in FIG. 1. The terminal assembly 10 includes a track set 30 and a track set 32. The track set 32 is a mirror image of track set 30, so track set 30 will be described in detail herein with the understanding that the description applies also to track set 32 unless otherwise noted.

The track set 30 comprises a first track 12, a second track 14, and a third track 16, arranged in a coplanar fashion. Each track includes one terminal connector 28 extending radially outwardly for connection to a stator lead wire, and two diode connectors 34 extending radially inwardly to connect the terminal assembly 10 to two diodes included in a rectifier bridge of an alternator assembly.

The track set 30 is formed in one embodiment by a stamping process from one piece of copper or other conductive material, resulting in a track set 30 disposed in substantially a single layer with one or more sprues connecting individual tracks to adjacent individual tracks (i.e. sprues 36 connecting first track 12 to second track 14, and sprues 56 connecting second track 14 to third track 16). Track set 32 is formed in the same manner. Track set 30 and track set 32 are then together at least partially encapsulated in insulating plastic material by an overmolding process. In the overmolding process, other features are also formed in the terminal assembly 10, including attachment holes 38 which are used in securing the terminal assembly 10. All sprues 36 and sprues 56 connecting the various individual tracks are then removed, thereby severing any undesired electrical connections between the individual tracks.

As an alternative to forming track set 30 and track set 32 by separate processes, track set 30 and track set 32 may be formed simultaneously from the same piece of copper or other conductive material. The result being a track set 30 and a track set 32 with one or more sprues 58 connecting individual tracks of track set 30 to individual tracks of track set 32 (i.e. sprues 58 connecting the third track 16 of track set 30 to the third track 16 of track set 32).

After forming the track set 30 and track set 32 simultaneously as described. The track set 30 and track set 32 are then at least partially encapsulated in an insulating plastic material by an overmolding process. The sprues 36, sprues 56, and sprues 58 connecting individual tracks to adjacent individual tracks are then broken, thereby severing an undesired electrical connection between the individual tracks.

Forming the individual tracks as track set 30 (or the combined track set 30 and track set 32) as described above instead of individually can simplify the manufacturability of the terminal assembly 10. The process as described has the benefits of reducing time and cost associated with the stamping process. The cost of the molding process is also reduced because only one (or two) track sets are loaded into a mold die versus six individual tracks that must be loaded into a mold die in the conventional process.

In addition to the manufacturability benefits, the terminal assembly 10 also improves cooling performance of a dynamoelectric machine into which it is installed. The single-layer configuration results in a thinner terminal assembly 10 in the axial direction, thereby allowing more internal airflow in the dynamoelectric machine which enhances cooling performance. Additionally, the thinner terminal assembly 10 leaves more available space in the dynamoelectric machine for other components, including rectifier heatsink fins, which may also have the benefit of enhancing cooling performance.

To facilitate a single-layer configuration, and still locate diode connectors 34 and terminal connectors 28 in desired locations, other unique elements are employed. First, in a conventional multi-layer track design the first track and the second track are both routed radially outwardly of an attachment hole. To achieve this, the tracks are layered one over the other. The terminal assembly 10, on the other hand, maintains a single layer by routing the first track 12 radially outwardly of attachment hole 38 and routing the second track 14 radially inwardly of attachment hole 38. Furthermore, in areas where the insulating plastic material might be located close to other features of the terminal assembly 10, local areas of the second track 14 might be required to remain exposed from the insulating plastic. Such a local area can be seen located radially inward of attachment hole 38 wherein the second track 14 is located close to two diode connecters 34. Locally exposing the second track 14 allows for proper clearance for an overmolding die of the overmolding process.

Third track 16 includes a tab 44 extending radially outwardly from an end opposite an end including the terminal connector 28. A tab hole 46 is located in the tab 44. During the overmolding process described above, plastic material flows into the tab hole 46 and cures, thereby forming a retention device to more effectively secure the third track 16 in the terminal assembly 10. Second track 14 extends radially outwardly in the local area 48 around tab 44 to maintain the single layer track configuration and also to maintain the desired width of second track 14. First track 12, in turn, extends radially outwardly in the local area 50 to maintain a single layer track configuration and also to maintain a desired width of first track 12.

Figure 2:
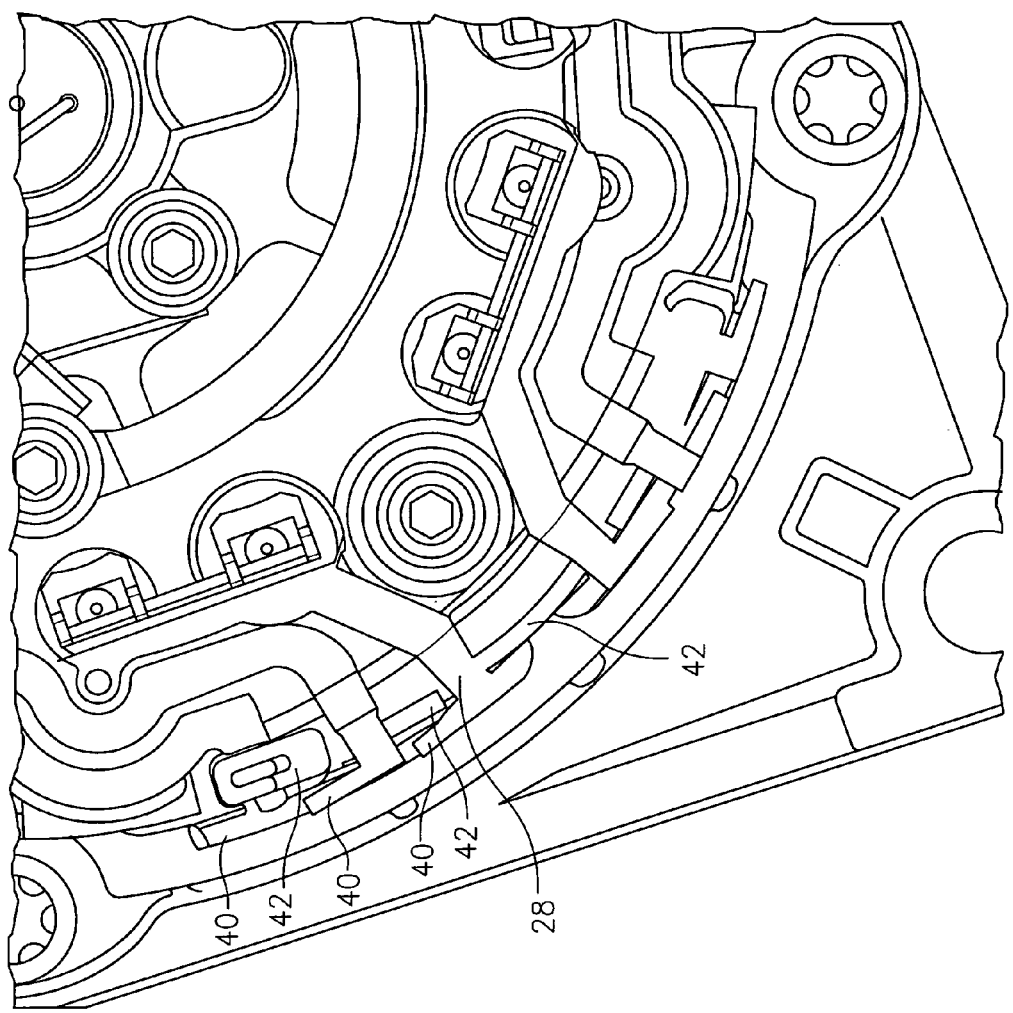
FIG. 2 is an enlarged partial plan view of a terminal assembly illustrating the terminal connectors.
Figure 3:
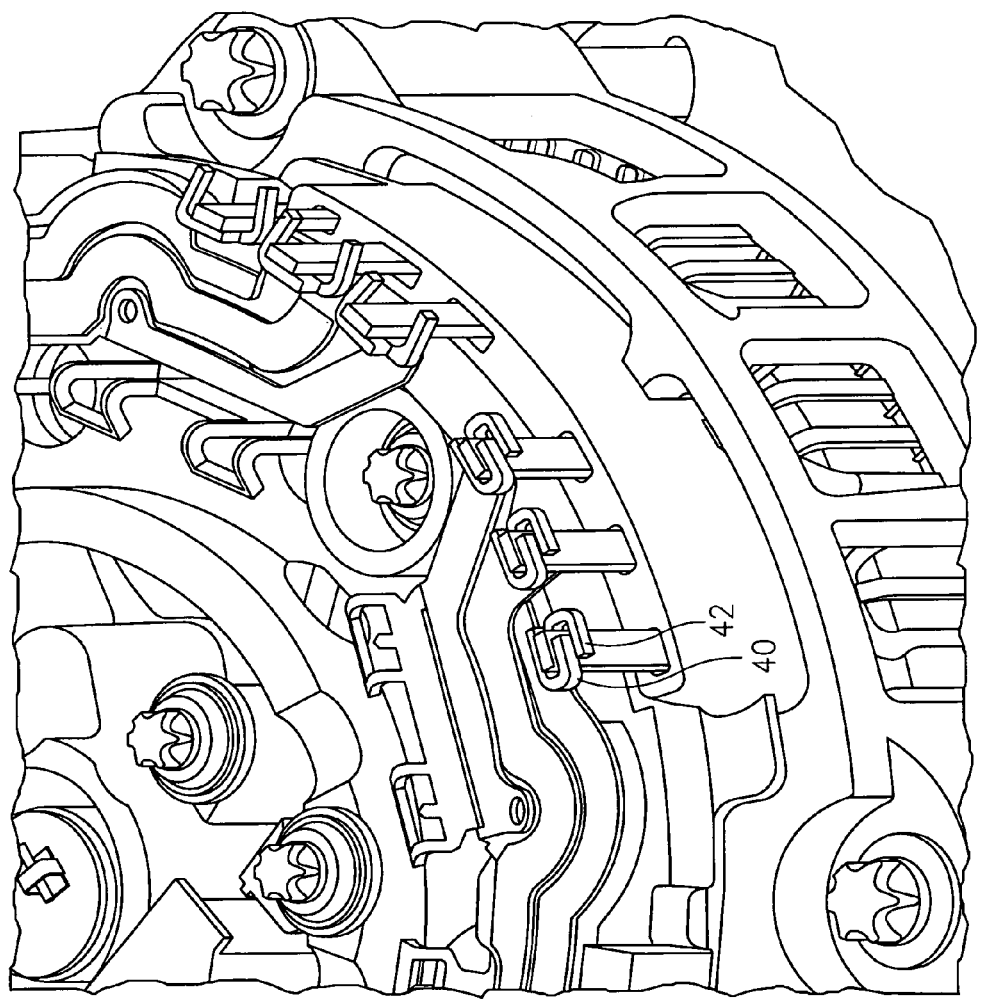
FIG. 3 is an enlarged partial perspective view of a terminal assembly illustrating the terminal connectors.

FIGS. 2 and 3 illustrate terminal assemblies 10 where the terminal connectors 28 are concentrated over less than approximately 90 degrees of circumference of the alternator. This concentration of the terminal connectors 28 may be desirable to mate a terminal assembly 10 to a stator design that requires the stator lead wires to exit a stator core from adjacent core slots. Conventional crimp legs, all formed at substantially the same axial position, may interfere with one another (in the flat state) when stamped from a single piece of copper. Alternatively the conventional crimp legs may be shortened to alleviate the interference, but when the shortened conventional crimp legs are crimped around a stator lead wire, their shortened length of the crimp length may be insufficient to retain a stator lead wire.

To solve the above described problem, each terminal connector 28 shown in FIGS. 2 and 3 comprises an upper crimp leg 40 and a lower crimp leg 42. The upper crimp legs 40 and lower crimp legs 42 are disposed in different axial locations as best seen in FIG. 3. The axial direction is defined as being co-axial with a rotor shaft of the alternator. When the terminal connectors 28 are in a stamped flat state as shown if FIG. 3, the upper crimp leg 40 of an individual track will be disposed radially outwardly of the lower crimp leg 42 of an adjacent individual track. The upper crimp leg 40 and the lower crimp leg 42 can thus be formed to a sufficient length to effectively retain a stator lead without interfering with crimp legs of adjacent terminal connectors 28. This crimp leg configuration allows terminal connectors 28, which are closely spaced to each other, to be stamped from a single piece of copper.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. A terminal assembly for a stator of a dynamoelectric machine comprising:
   at least five electrically conductive tracks disposed in a single layer, each track configured and positioned for electrical communication between a rectifier bridge and at least one lead of a plurality of leads extending from the stator, at least six of the leads disposed in an arc of less than 90 degrees of circumference of the dynamoelectric machine; and
   a nonconductive casing at least partially encapsulating the at least five tracks.

2. The terminal assembly of claim 1, wherein one or more tracks of the at least five tracks includes a tab, the tab including a retaining hole that when encapsulated retains the one or more tracks including the tab within the terminal assembly.

3. The terminal assembly of claim 2, wherein a first track of the at least five tracks extends radially outwardly in a local area to avoid interference with a second track of the at least five tracks.

4. The terminal assembly of claim 1, wherein one or more tracks of the at least five tracks include a connector to electrically communicate with a corresponding lead of the plurality of leads.

5. The terminal assembly of claim 4, wherein a first connector includes at least a first leg and a second connector includes at least a second leg, the first leg being disposed in a different axial location than the second leg.

6. The terminal assembly of claim 1 wherein the at least five tracks is six tracks.

7. The terminal assembly of claim 1 wherein the portion of one of the tracks of the at least five tracks is exposed from the nonconductive casing to allow for clearance of an overmolding die.

8. The terminal assembly of claim 1 wherein the nonconductive casing includes one or more attachment features to enable attachment of the terminal assembly to the dynamoelectric machine.

9. The terminal assembly of claim 8 wherein a first track of the at least five tracks extends radially outwardly in a local area around a first attachment feature and a second track of the at least five tracks extends radially inwardly in a local area around the first attachment feature.

10. The terminal assembly of claim 1 wherein at least six of the leads exit a stator core from adjacent core slots.

11. A terminal assembly for a stator of a dynamoelectric machine having a plurality of leads extending therefrom, the terminal assembly comprising:

at least six electrically conductive tracks disposed in a single layer, each track of the at least six tracks configured and positioned for providing electrical communication between at least one lead the plurality of leads and a rectifier bridge;

a first track of the at least six tracks extends radially outwardly in a local area around a first attachment feature and a second track of the at least six tracks extends radially inwardly in a local area around the first attachment feature; and the first track of the at least six tracks extends radially outwardly in a local area, other than in the area around a first attachment, to avoid interference with the second track of the at least six tracks.

* * * * *